United States Patent [19]

Bowman-Jones et al.

[11] Patent Number: 4,804,862

[45] Date of Patent: *Feb. 14, 1989

[54] ELECTRO MECHANICAL SWITCH HAVING REMOTELY CONTROLLED OFF POSITION

[75] Inventors: Gordon Bowman-Jones, Foster City, Calif.; James E. Warthan, Indianapolis, Ind.

[73] Assignee: Steven F. Lachman, San Mateo, Calif.

[*] Notice: The portion of the term of this patent subsequent to Apr. 14, 2005 has been disclaimed.

[21] Appl. No.: 903,318

[22] Filed: Sep. 3, 1986

[51] Int. Cl.$^4$ .............................................. H01H 1/52
[52] U.S. Cl. ................................ 307/140; 307/132 E; 307/114; 200/291; 335/15; 335/21
[58] Field of Search .............. 307/140, 132 R, 132 E, 307/114; 200/325, 322, 336, 153 J, 153 L, 153 N, 291; 335/2, 15, 21, 22, 171, 167, 170

[56] References Cited

U.S. PATENT DOCUMENTS

| 3,134,879 | 5/1964 | Gauthier et al. | 200/322 X |
| 3,497,643 | 2/1970 | Heath | 200/336 X |
| 4,291,207 | 9/1981 | Reinke et al. | 200/325 X |
| 4,392,036 | 7/1983 | Troebel et al. | 200/322 |
| 4,394,585 | 7/1983 | Alberti | 307/140 |
| 4,639,612 | 1/1987 | Bowman-Jones | 307/132 E |

Primary Examiner—William M. Shoop, Jr.
Assistant Examiner—Sharon D. Logan
Attorney, Agent, or Firm—Flehr, Hohbach, Test, Albritton & Herbert

[57] ABSTRACT

The switch includes a cantilevered switch arm including a power contact, first and second switch terminals with the power contact positioned therebetween, the cantilevered switch arm being yieldably biased with the power contact engaging the first switch terminal. A manually operated lever is provided for engaging and disengaging the switch arm and moving the power contact into engagement with the second switch terminal. A pivotable latch arm is provided for latching the switch arm with the power terminal engaging the second switch terminal. A solenoid is actuable in response to removal of power from the power contact for pivoting the latch arm and releasing the switch arm.

7 Claims, 3 Drawing Sheets

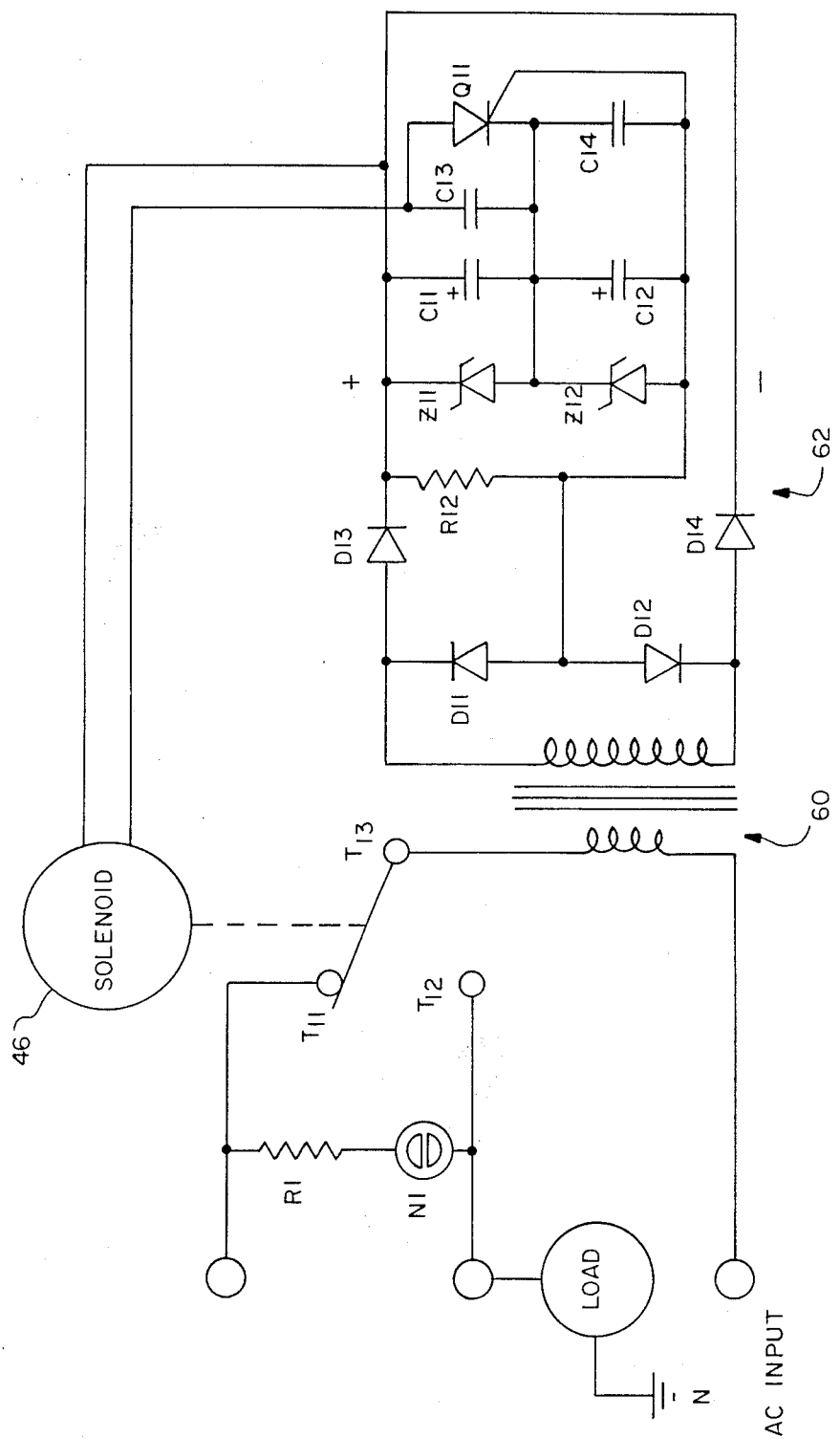
FIG.—5

ELECTRO MECHANICAL SWITCH HAVING REMOTELY CONTROLLED OFF POSITION

This invention is related to my copending application Ser. No. 06/729,924 filed May 3, 1985, now U.S. Pat. No. 4,639,612, issued Jan. 27, 1987.

This invention relates generally to switch apparatus for electrical loads, and more particularly the invention relates to an electro mechanical switch which can be remotely turned off.

In large buildings having many light circuits, for example, it is desirable to control the lights remotely from a central control center. This has been accomplished before by applying additional interconnecting wires or superimposing a carrier signal on the power line for transmitting control signals to special switches in the lighting environment.

Switches are known which can be turned on or off remotely by selectively interrupting of power. However, such switches are relatively complex and expensive.

The present invention is directed to remotely controlling only the off position of a switch by momentary interruption of power to the switch circuit. Thus, lighting loads in an office building, for example, can be turned off from a central control station in order to conserve energy consumption. Power can thereafter be returned to the switch circuit, and the lighting load can be re-energized manually by a user at the location.

Accordingly, an object of the invention is an efficient method of remotely controlling power consumption in a multiload environment such as an office building.

Another object of the invention is an economical electro-mechanical switch which responds to momentary power interruption by assuming an off position.

Briefly, an electro-mechanical switch in accordance with the invention comprises a cantilevered switch arm including a power contact, first and second switch terminals with the power contact positioned therebetween, the cantilevered switch arm being yieldably biased whereby the power contact engages the first switch terminal. A manually operable lever means engages the switch arm and moves the power contact into engagement with the second switch terminal. A pivotable latch arm is provided for latching the switch arm with the power terminal engaging the second switch terminal. Solenoid means is actuable in response to removal of power from the power contact for pivoting the latch arm and releasing the switch arm.

In accordance with one feature of the invention the lever means includes spring means for yieldably biasing the lever means to a position where the power contact engages the first switch terminal in an OFF position.

In accordance with another feature of the invention the lever means includes a latch member for engaging the pivotable latch arm and latching the switch arm with the power terminal engaging the second switch terminal in an ON position. The latch member includes a latch surface for latching with the latch arm and a pivot point for engaging the latch arm as a point of pivot when the latch arm is pivoted by the rotary actuator means.

The invention and objects and features thereof will be more readily apparent from the following detailed description and appended claims when taken with the drawing, in which:

FIG. 5 is an electrical schematic of circuitry responding to power interruption for turning the switch of FIG. 4 to an off position.

Figures 1, 2:
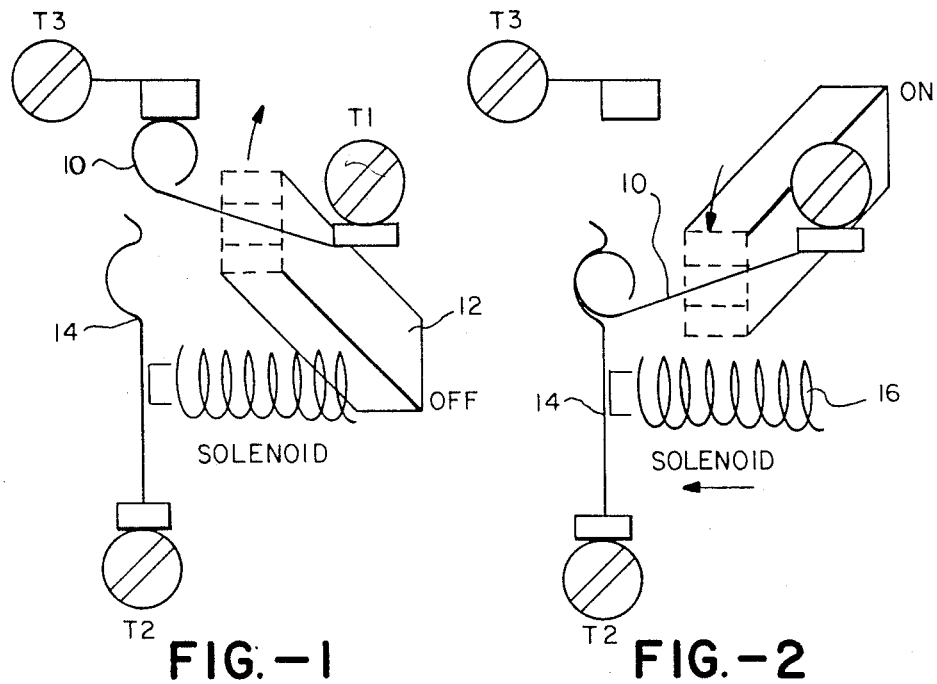
FIG. 1 is a schematic representation of a switch in accordance with my copending application in an OFF position.
FIG. 2 is a schematic representation of the switch of FIG. 1 in an on position.

Referring now the drawings, FIG. 1 is a schematic representation of one embodiment of a switch in accordance with my copending application. The switch controls power from the incoming power terminal T1 to a second electrical terminal T2 (ON position) or to a third terminal T3 (OFF position). A spring contact 10 connected to terminal T1 is biased upwardly to OFF terminal T3 and can be manually moved to the ON position by means of a conventional toggle lever 12. When toggle lever 12 is moved to the ON position, as shown in FIG. 2, lever 10 engages a cam surface of a spring contact 14 which is electrically connected to the terminal T2. The contact 14 is spring biased to maintain engagement with contact 10, the mating cam surface of lever 14 conforming to the enlarged end of spring contact 10.

The switch can be returned to the OFF position manually by moving the toggle lever 12 or, in accordance with the invention, a solenoid 16 is momentarily energized with a piston moving the spring contact 14 out of engagement with the spring contact 10 whereupon the biased spring contact 10 moves upwardly in contact with terminal T3 in an OFF position.

Figure 3:
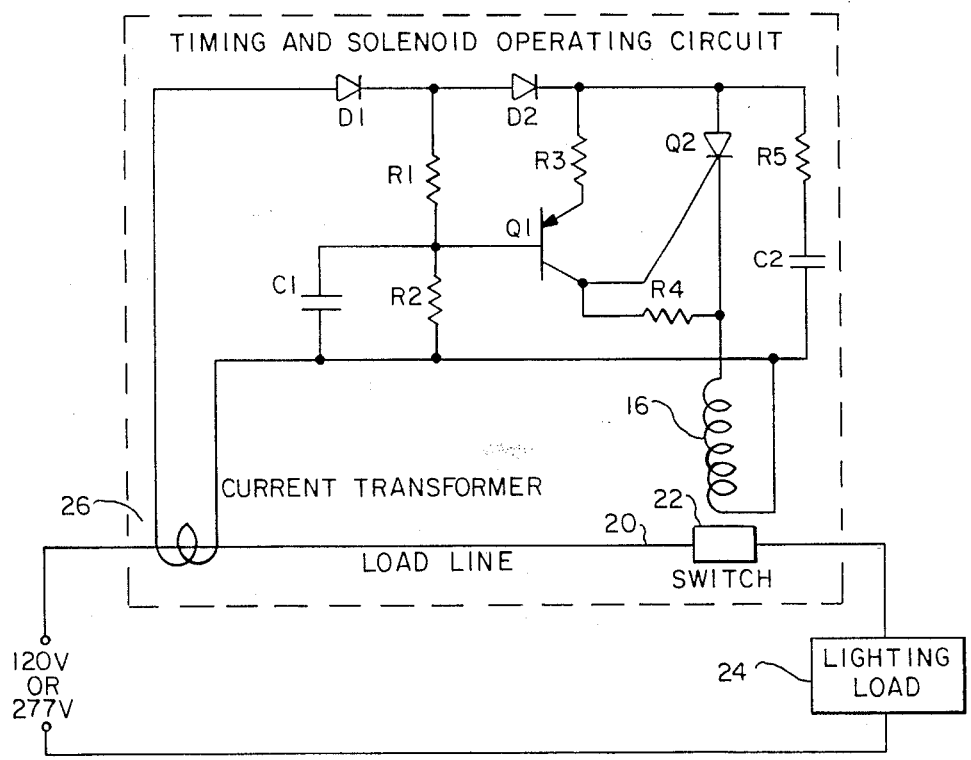
FIG. 3 is an electrical schematic of circuitry responding to power interruption for turning the switch of FIG. 1 to an OFF position.

Actuation of solenoid 16 is controlled by the electrical circuit shown in FIG. 3. Power from a 120 volt or 277 volt line is applied through a load line 20 and the switch shown generally at 22 to lighting load 24. Coupled to the load line 20 is a current transformer 26 which charges capacitors C1 and C2 through two serially connected diodes D1 and D2 and resistors R1 and R5. Capacitor C1 is serially connected with resistor R1 and in parallel with resistor R2, and capacitor C2 is connected serially with resistor R5.

When electrical power is removed form the load line 20 for a minimum period of time of three seconds, for example, the charge on capacitor C1 discharges through the base of transistor Q1 which is serially connected with resistors R3 and R4 across a silicon controlled rectifier (SCR) Q2. When C1 is discharged, Q1 turns on into the gate of SCR Q2 thus firing the SCR. Q2 then conducts the charge on capacitor C2 through resistor R5 into the coil of solenoid 16. The solenoid piston drives forward in the direction indicated in FIG. 2, moving the spring contact 14 and releasing the spring contact 10 thereby opening the circuit. A neon indicator can be provided inside the switch which becomes illuminated across the open contact thereby indicating that power is available to the switch. The switch can now be turned on manually to restore power to the load, if desired.

Figure 4A:
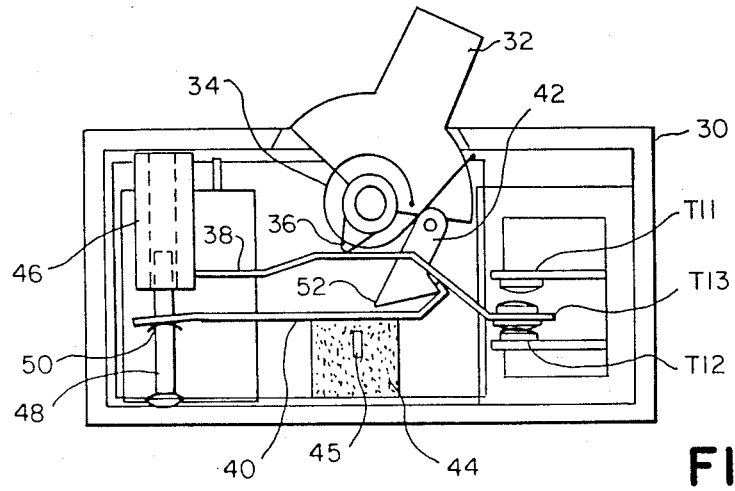
FIGS. 4A-4C are side views of an electro-mechanical switch in accordance with one embodiment of the present invention and illustrate operation thereof.
Figure 4B:
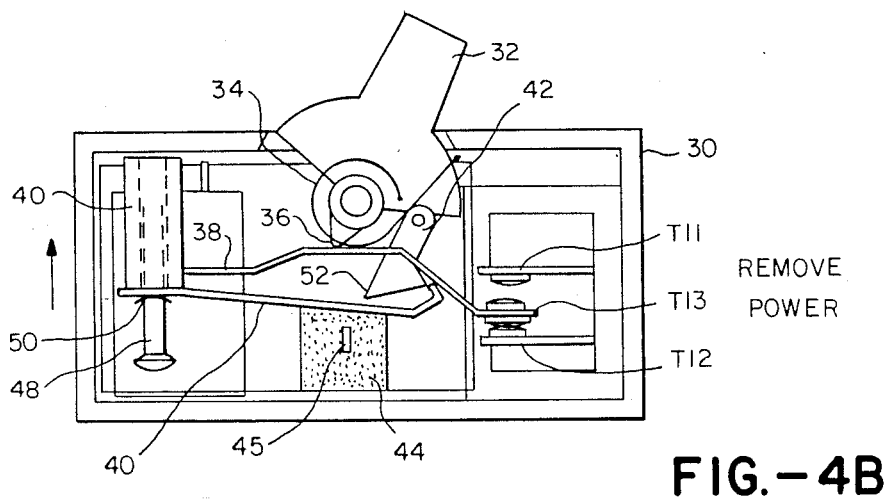
Figure 4C:
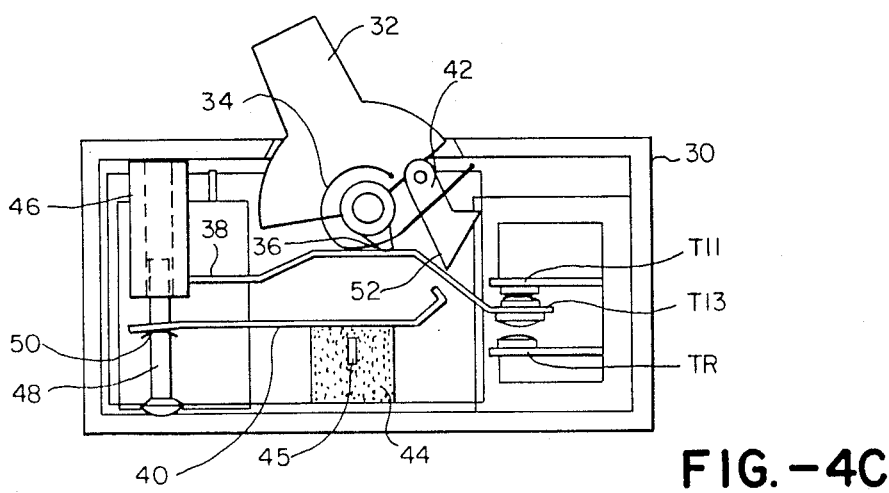

FIGS. 4A-4C are side views illustrating operation of an electro-mechanical switch in accordance with the present invention. FIG. 4A shows the switch in an ON position, FIG. 4B shows the switch when power is removed, and FIG. 4C shows the switch in an OFF position. The switch includes a housing 30 (shown in section view) with a rotary actuator 32 rotatably mounted therein. A coil spring 34 yieldably biases the rotary actuator 32 to an OFF position as illustrated in FIG. 4C. The rotary actuator 32 includes a cam surface 36 that engages a cantilivered switch arm 38. A power contact T13 is mounted on one end of the cantilevered switch arm 38 between terminals T11 and T12. A latch arm 40 engages a latch member 42 depending from the rotary actuator 32 with the latch arm 40 resting on a yieldable support such as foam member 44. Preferably the latch arm 40 includes a depending member (not shown) that rides in a slot 45 within the foam member for maintaining the latch arm positioned in alignment on the support 44. Solenoid 46 has a plunger 48 to which the latch arm 40 is pivotally attached at 50.

FIG. 4A shows the switch in an on position with the power contact T13 engaging contact T12 for energizing a load connected thereto. The latch member 42 engages latch arm 40 with the cam surface 36 maintaining the switch arm 38 in a depressed position with the contact T13 engaging contact T12. Upon removal of power from the contact T13 and expiry of timing capacitor C12, the solenoid 46 is actuated by power from C11 through Q11 and plunger 48 pivots the latch arm 40 for releasing latch member 42 and allowing the cantilevered switch arm 38 to move to an upper position with contact T13 engaging contact T11, as shown in FIG. 4C. In accordance with a feature of the invention, the latch member 42 includes a pivot point 52 for engaging the latch arm 40 as a pivot point when the latch arm is pivoted by the manual operation of the rotary actuator 32. The foam support 44 allows the latch arm 40 to pivot downwardly and release the latch member 42. Upon release of the latch member 42 the biased spring 34 rotates the rotary actuator 32 to the OFF position as shown in FIG. 4C, and thereafter the resilient foam member resumes its initial shape and moves the latch arm 40 to a horizontal position as shown in FIG. 4C.

FIG. 5 is an electrical schematic of circuitry for controlling the solenoid 46 in FIGS. 4A-4C. As illustrated, the AC power input is connected to contact T13 which engages contact T11 in an OFF position and engages contact T12 in an ON position. A current transformer 60 couples power to circuitry shown generally at 62. Diodes D11, D12, D13 and D14 are connected across secondary winding of transformer 60 and rectify the current therefrom. Positive current charges serially connected capacitors C11 and C12. The solenoid 46 is connected across the positive and negative lines of the control circuitry 62 through silicon controlled rectifier Q11. When the electro-mechanical switch is turned on and current flows through the primary winding of transformer 60, the capacitors C11 and C12 develop a charge. Upon removal of power, the charge on capacitor C12 discharges through R12 until the control terminal of SCR Q11 becomes positively biased, thereby triggering the SCR. Upon triggering of SCR Q11 the charge stored on capacitor C11 discharges through the solenoid 46 and SCR Q11 thereby retracting the plunger of solenoid 46.

In one embodiment the following values were used:

| R1 100K | Z11 15 V Zener diode |
| R12 68K | Z12 5.1 V Zener diode |
| N1 Neon indicator | C11 2200 $\mu$f 16 v |
| 60 current transformer | C12 150 $\mu$f 16 v |
| D11-D14 1N4001 | C13 0.001 $\mu$f |
| C14 0.001 $\mu$f | Q11 MCR 22-2 SCR |

An electromechanical switch in accordance with the inventions is efficient in operation and economical to install. While the switch has been described with reference to a specific embodiment, the description is illustrative of the invention and is not be construed as limiting the invention. For example, the lever and spring contact could be replaced by a spring biased sliding which engages fixed contacts and is latched by the solenoid. Thus, various modifications and applications may occur to those skilled in the art without departing from the true spirit and scope of the invention as defined by the appended claims.

What is claimed is:

1. An electro-mechanical switch comprising
   a cantilevered switch arm including a power contact,
   first and second switch terminals with said power contact positioned therebetween, said cantilevered switch arm being yieldably biased whereby said power contact engages said first switch terminal,
   manually operable lever means for engaging said switch arm and moving said power contact into engagement with said second switch terminal,
   a pivotable latch arm for latching said switch arm whereby said power terminal engages said second switch terminal, and
   solenoid means actuable in response to removal of power from said power contact for pivoting said latch arm and releasing said switch arm.

2. The electro-mechanical switch as defined by claim 1 wherein said lever means includes spring means for yieldably biasing said lever means to a position where said power contact engages said first switch terminal in an off position.

3. The electro-mechanical switch as defined by claim 2 wherein said lever means further includes a cam for engaging said switch arm.

4. The electro-mechanical switch as defined by claim 3 wherein said lever means further includes rotary actuator means a latch member for engaging said pivotable latch arm and latching said switch arm whereby said power terminal engages said second switch terminal.

5. The electro-mechanical switch as defined by claim 4 wherein said latch member further includes a latch surface for latching with said latch arm and includes a pivot point for engaging said latch arm as a pivot point to release said latch surface when said latch arm is pivoted by said rotary actuator means.

6. The electro-mechanical switch as defined by claim 1 wherein said lever means includes rotary actuator means and a latch member for engaging said pivotable latch arm and latching said rotary actuator means and said switch arm whereby said power terminal engages said second switch terminal.

7. The electro-mechanical switch as defined by claim 6 wherein said latch member further includes a latch surface for latching with said latch arm and includes a pivot point for engaging said latch arm as a pivot point to release said latch surface when said latch arm is pivoted by said rotary actuator means.

* * * * *